United States Patent [19]

Roesner

[11] 4,120,353

[45] Oct. 17, 1978

[54] DEVICE TO MOVE DENSITY LOGGING TOOL AGAINST WELL WALL

[75] Inventor: Raymond Earl Roesner, Houston, Tex.

[73] Assignee: Dresser Industries, Inc., Dallas, Tex.

[21] Appl. No.: 788,956

[22] Filed: Apr. 19, 1977

[51] Int. Cl.² .............................................. E21B 47/08
[52] U.S. Cl. .................................. 166/65 R; 166/113
[58] Field of Search ............. 166/113, 100, 241, 65 R, 166/65 M

[56] References Cited

U.S. PATENT DOCUMENTS

| | | | |
|---|---|---|---|
| 1,406,350 | 2/1922 | Corrigan | 166/65 R |
| 2,500,785 | 3/1950 | Arutunoff | 166/117.5 |
| 2,563,284 | 8/1951 | Seay, Jr. | 166/100 |
| 3,168,141 | 2/1965 | Lebourg | 166/65 R |
| 3,356,146 | 12/1967 | Anderson | 166/241 |
| 3,661,205 | 5/1972 | Belorgey | 166/65 R |

Primary Examiner—Ernest R. Purser
Attorney, Agent, or Firm—Roy L. Van Winkle

[57] ABSTRACT

A wellbore logging instrument is disclosed of the type having a density pad maintained in close proximity to the tool body, and a decentralizing arm pivotally mounted on the body and arranged to swing outward against the borehole to move the tool body and density pad against the opposite borehole wall. The apparatus includes a linkage assembly to provide a slight extension of the density pad at any selected time in the borehole.

3 Claims, 15 Drawing Figures

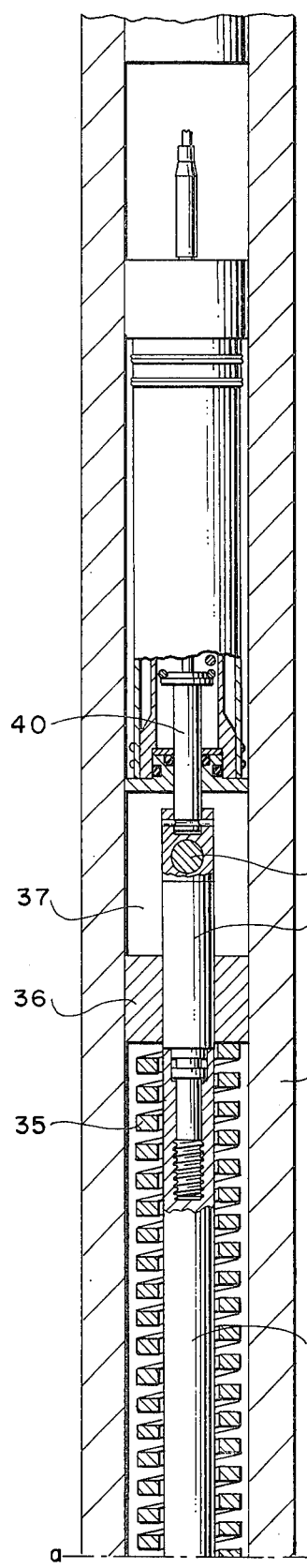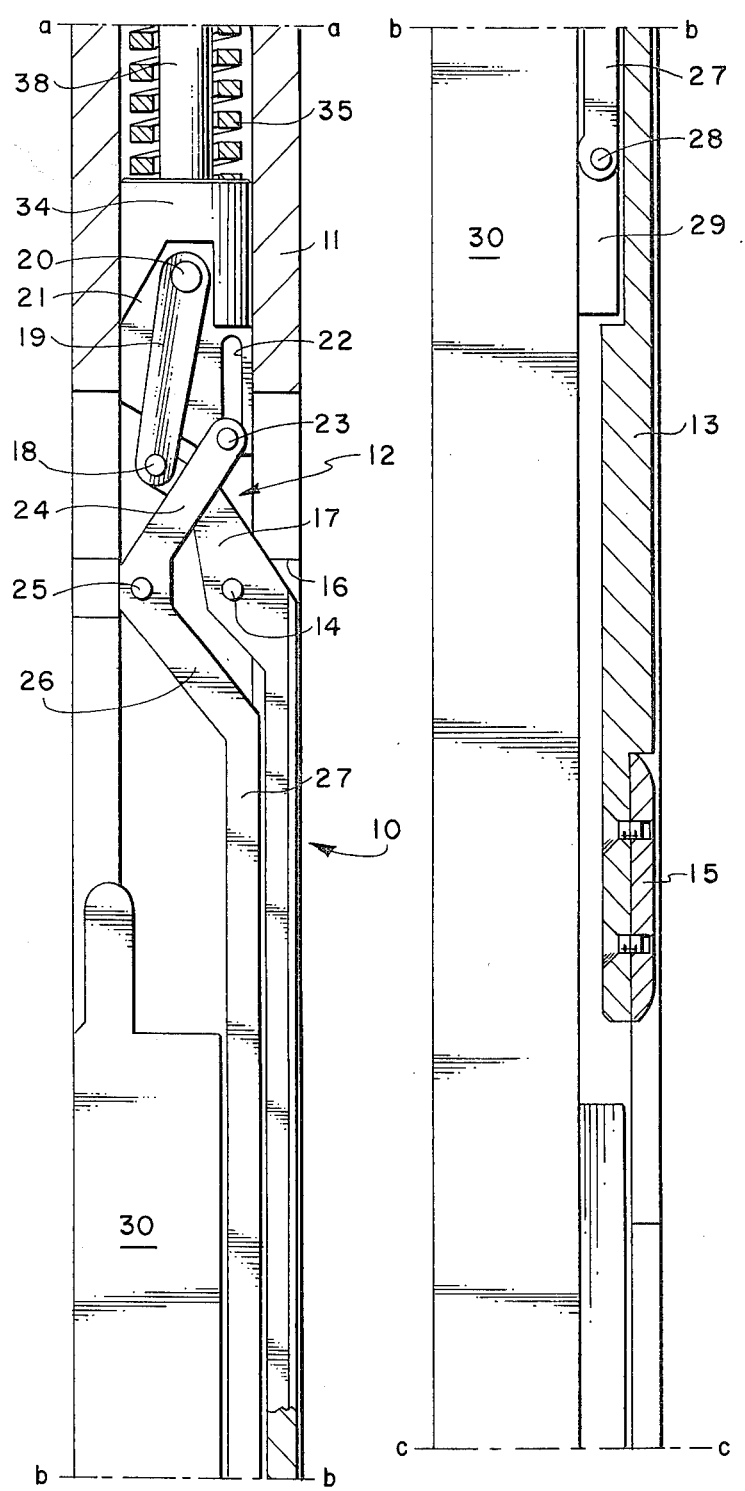
FIG. 1  FIG. 1B  FIG. 1C

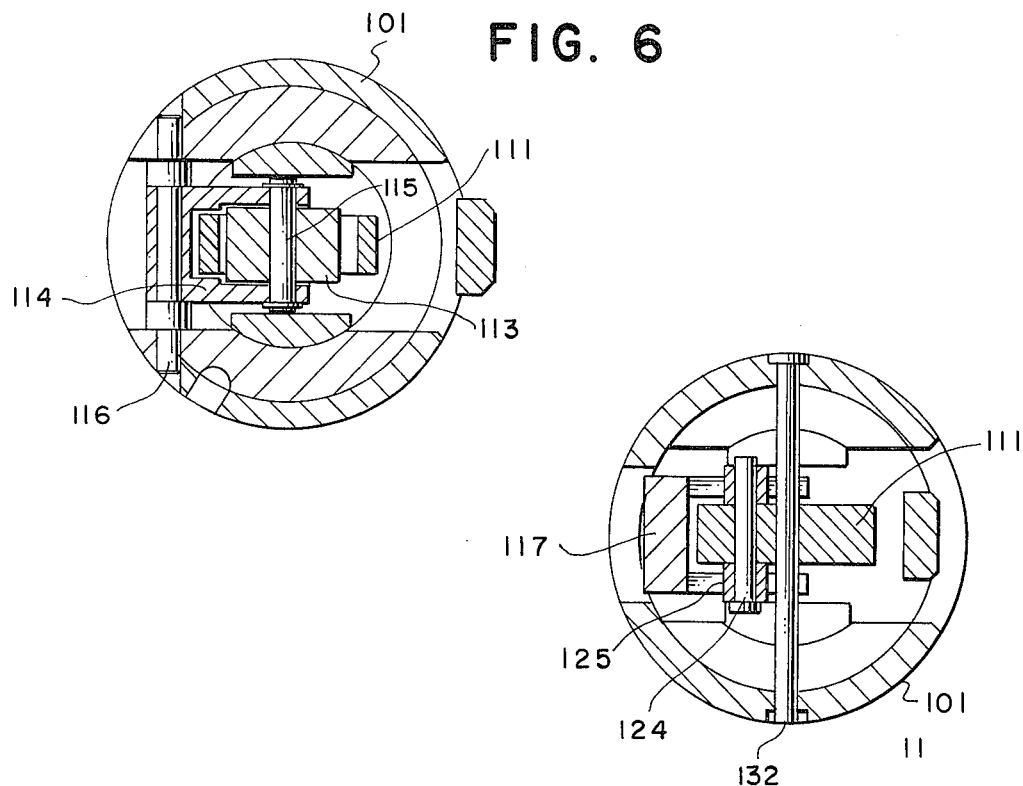
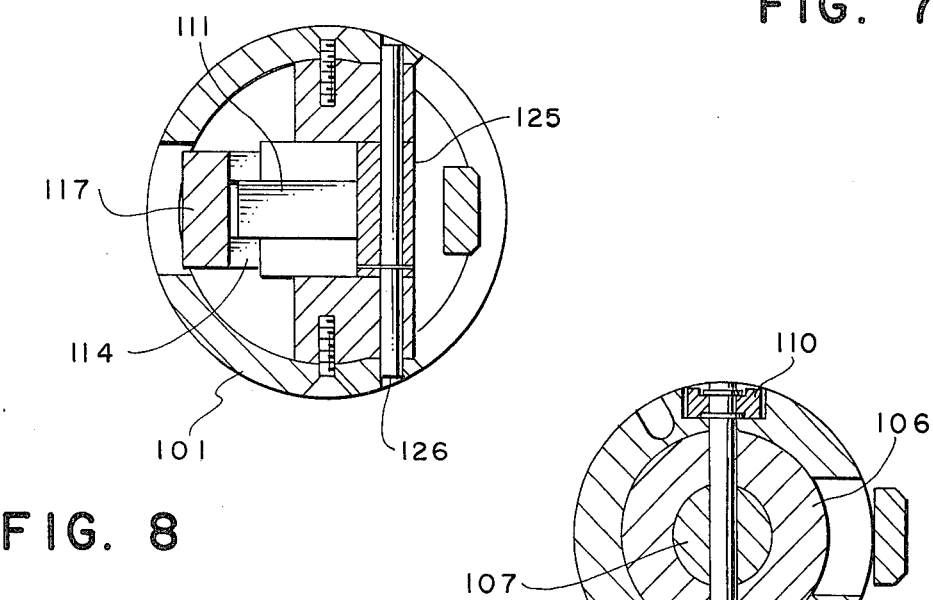

DEVICE TO MOVE DENSITY LOGGING TOOL AGAINST WELL WALL

BACKGROUND OF THE INVENTION

The present invention generally involves well logging instruments, and more specifically discloses embodiments directed to combination instruments which perform such functions as measuring formation density and wellbore diameter in addition to running radioactive logs such as a neutron log.

Previous tool designs accomplished these functions using an elongated body having a widely extendable decentralizer arm and drag pad, which arm also comprised part of the caliper instrument. On the back side of the body was the heavy density pad which preferably was kept close to the tool body for accuracy of the logging function. It was preferable to make this pad slightly extendable from the body, for instance one-fourth to three-fourths of an inch extension.

In one type of prior art device, this slight extension of the so-called "fixed pad" containing the logging signal transmitter and receiver, was achieved prior to lowering the tool into the well, and the fixed pad was actually pinned into place in its extended position. Thus, the pad became known as the fixed pad because it remained in the extended position at all times when in the wellbore.

The disadvantage in the fixed pad design is that it undergoes considerable wear and deterioation moving up and down the borehole at speeds of up to 500 feet per minute. This would also shake and dislodge the electrical components in the pad, causing malfunction there.

One solution to the problem has been to incorporate a complex hydraulic-mechanical system into the tool to provide for extension of the density pad at a selective position in the borehole. Examples of this are found in U.S. Pat. Nos. 3,356,146 and 3,254,221. This complex hydro-mechanical system requires extensive modification of the tool configuration to incorporate the needed pad extension components. In addition, the density pad extension is accompanied by extension of a hydraulic cylinder into the wellbore, and control of the amount of extension is lacking at the top of the assembly.

The present invention overcomes these disadvantages by providing a mechanical linkage assembly which is not overly complex yet which provides a predetermined extension of the density pad at the desired time in the wellbore. The invention does not require extension modification of the tool configuration to achieve the desired pad extension.

BRIEF DESCRIPTION OF THE DRAWINGS

FIGS. 1a–1d, when joined at common lines a–a, b–b and c–c form FIG. 1 which comprises a schematic cross-sectional view of one embodiment of the invention.

FIGS. 6–9 illustrate cross-sectional axial views of the second embodiment taken at lines 6—6 through 9—9 in FIG. 5.

DESCRIPTION OF THE PREFERRED EMBODIMENTS

Figure 1D:
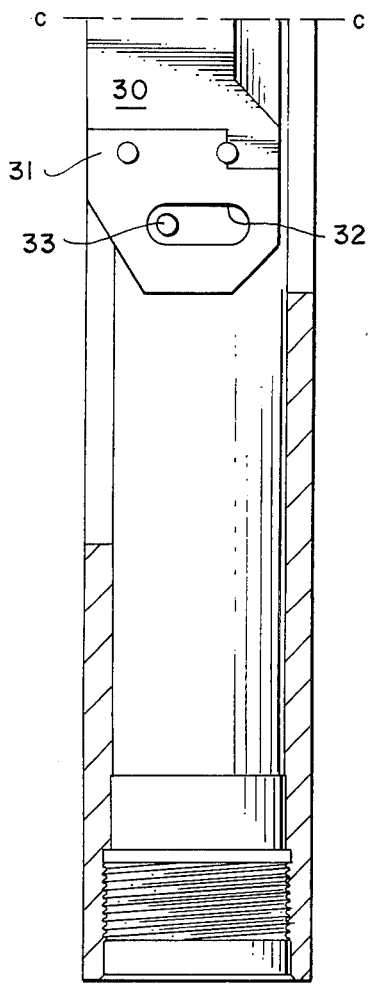

FIG. 1 is a schematic cross-sectional illustration of one embodiment of the logging tool 10. The tool 10 comprises a generally cylindrical elongated body member 11 in which is located a collapsible linkage assembly 12. A widely extendable caliper arm 13 is pivotally connected to the body at pin 14 and has at its outermost end a contact pad 15.

Caliper arm 13 is arranged to be folded into a receptacle opening 16 cut through the wall of body 11. Caliper arm 13 has a bellcrank arm 17 extending past pivot pin 14 and pivotally connected by pin 18 to a slide arm 19. Arm 19 is pivotally connected by pin 20 to a sliding block 21 located slidably in body 11.

Sliding block 21 has a follower channel 22 formed therein which contains a sliding pin 23 captively held therein. Rotatably connected to pin 23 is a bellcrank arm 24 pivotally connected at 25 to body 11. Arm 24 extends downward past pin 25 in an angular section 26 and an extended vertical section 27. The lower end of extended arm section 27 is pivotally connected at 28 to the back shoulder 29 of a density logging pad 30.

Pad 30 contains various logging signal transmitters and receivers such as radioactive logging elements. A bottom cap 31 is connected to density pad 30 and contains a guide opening 32 formed therein into which projects a limit peg 33 for limiting outward extension of pad 30.

Sliding block 21 is securely connected to an actuator plunger 34 which is abutted by a compression spring 35. A stationary collar 36 is in abutment with the upper end of coil spring 35 and is secured within body 11 against vertical movement. A pair of side bar links (not shown) connect a drive motor (not shown) to crosspin 39a which is securely engaged in the intermediate plunger shaft 39. Shaft 38 extends concentrically inside of spring 35, collar 36 and sleeve 37 and is threadedly connected to intermediate shaft 39, which in turn is attached to a potentiometer shaft 40.

Figure 2:
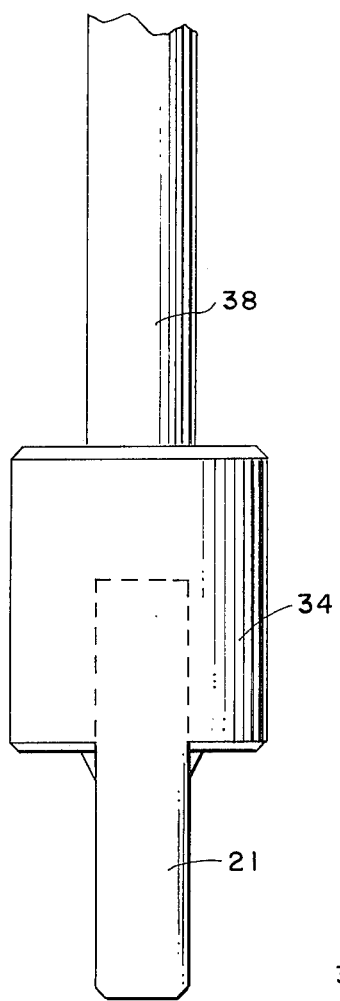
FIGS. 2, 3, and 4 illustrate different views of a portion of the linkage of the first embodiment.
Figure 4:
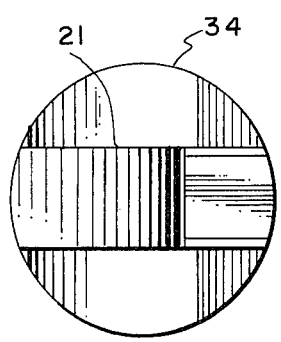
Figure 3:
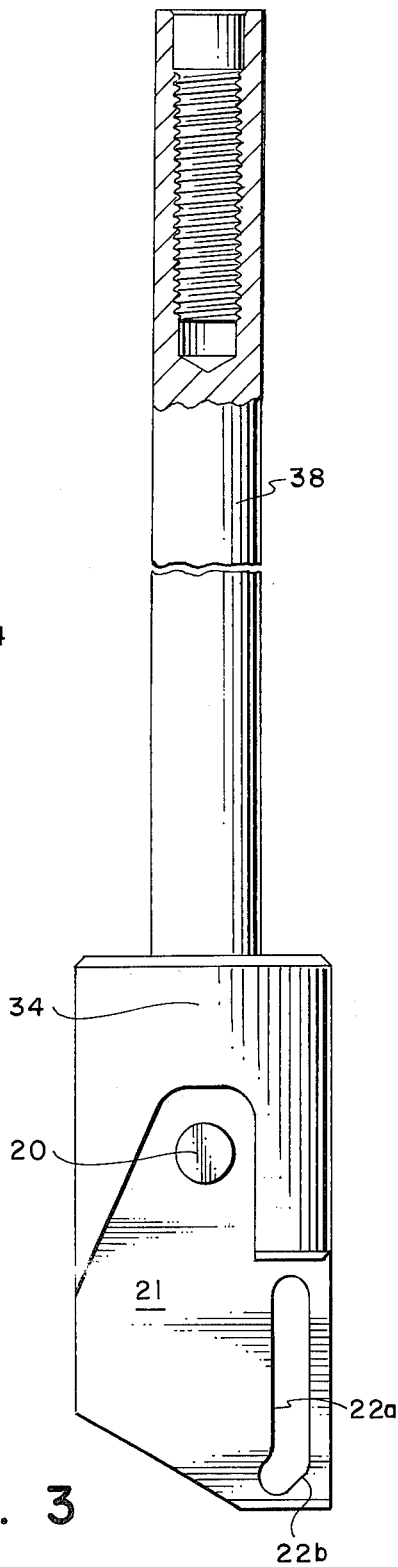
Figure 5A:
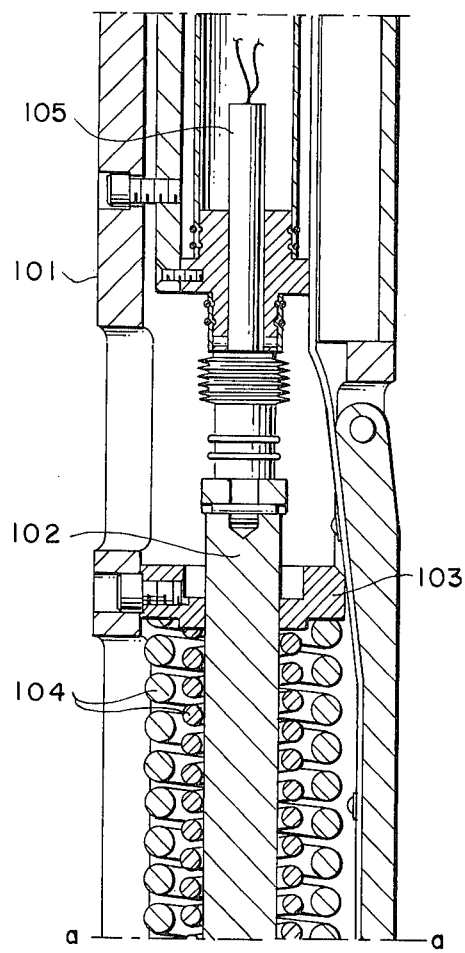
FIGS. 5a–5d, when joined at common lines a–a, b–b and c–c form FIG. 5 which illustrates a second embodiment of the invention.
Figure 5B:
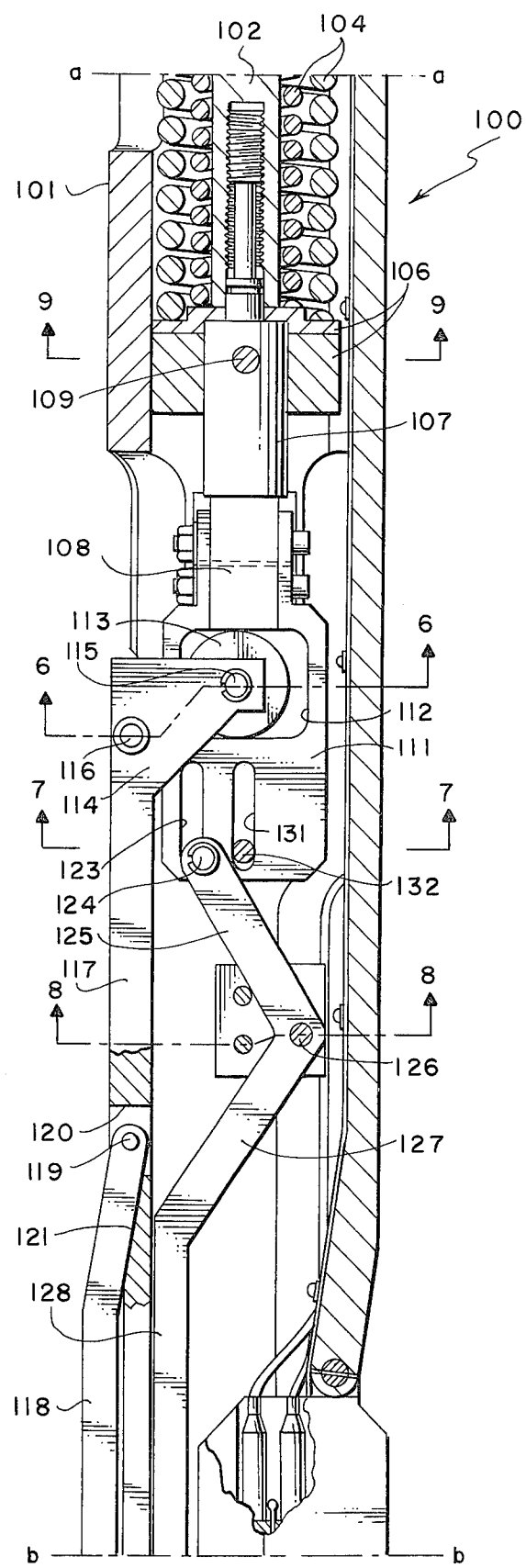
Figure 5C:
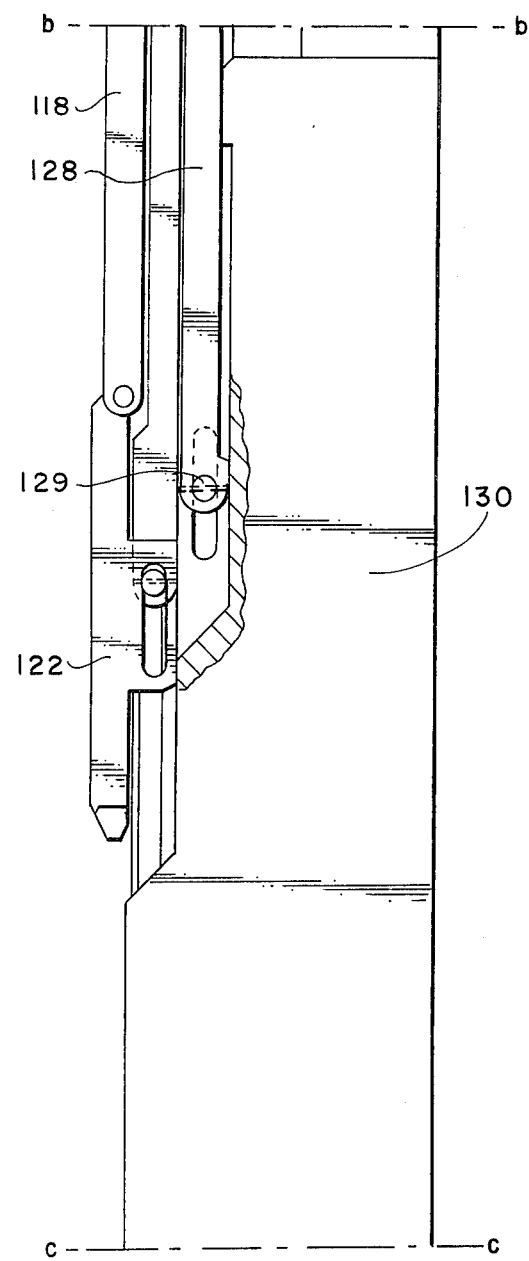
Figure 5D:
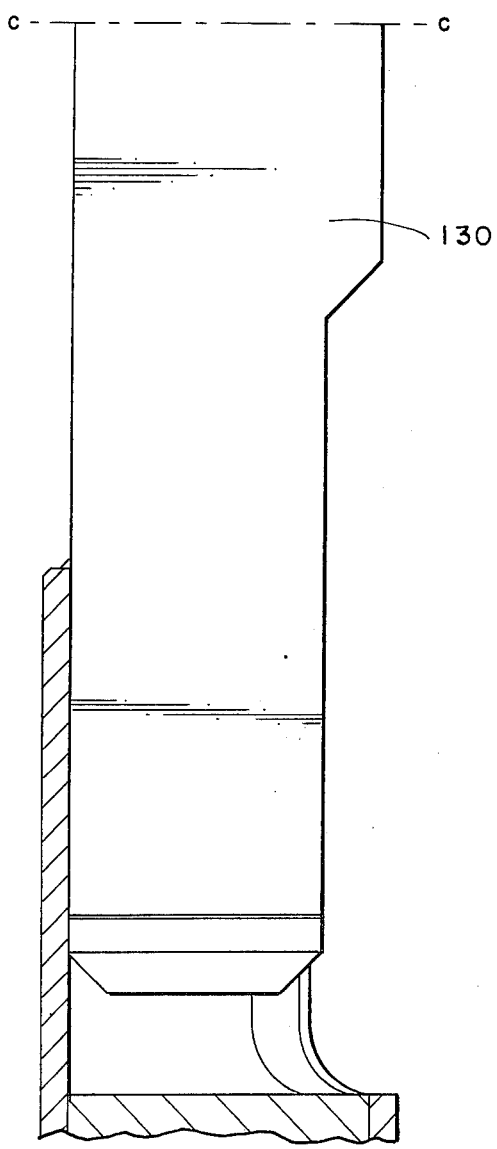

Referring now to FIGS. 2 and 3, an enlarged view of the sliding block 21 and actuator plunger 34 is shown. In FIG. 3 the follower channel 22 is more clearly seen. Channel 22 consists of an elongated vertical section 22a and an angular down-turned section 22b at one end. The engagement of pin 23 is in the lowermost end of section 22b when the tool is completely collapsed and ready for free sliding movement downhole.

In typical operation, the logging tool 11 is placed on the wireline with the other logging tools in its collapsed position as illustrated in FIG. 1. The tools are lowered into the borehole to the formation to be logged. The tool is then actuated by means of the electric motor which applies a downward movement to shafts 38, 39, and 40 through side links (not shown).

The downward movement releases coil spring 38 against actuator plunger 34 thereby moving plunger 34 and slide block 21 downward in the tool. Downward movement of slide block 21 reacts through slide arm 19 to apply an opening force on bellcrank arm 17 thereby pivoting caliper arm 13 outward until pad 15 engages the borehole wall. This engagement of pad 15 against the borehole serves to decentralize tool 11, pushing it across the borehole against the opposite wall. Upon the initial downward movement of slide block 21, pin 23 on bellcrank arm 24 will be forced through section 22b into section 22a of the follower channel 22. This slight angular movement from section 22b applies a very slight rotational moment to bellcrank arm 24 which is transferred through pin 25 to angular section 26 and vertical arm 27.

The multiplication of this rotation of 24 throughout the length of 27 results in a predetermined radial outward movement of density pad 30 by means of pin 28 on the rear shoulder 29 of the density pad. Thus upon initial expansion of caliper arm 13 to contact the borehole wall and force the logging pad 30 against the opposing wall, a slight initial extension of pad 30 will be achieved simultaneous with the opening of caliper arm 13. This preselected extension of density pad 13 is sufficient to provide the optimum logging accuracy of the radioactive instruments located in the large pad.

Referring now to FIGS. 5–9, a second embodiment of the invention is illustrated utilizing a density pad and caliper arm arrangement. In FIG. 5, the logging tool 100 is illustrated in cross-sectional schematic view having an elongated generally cylindrical body 101 in which is located a central shaft 102 connected to potentiometer 105. A pair of coil springs 104 are held in compression by a spring plate 103 around shaft 102. A lower spring plate assembly 106 receives the lower end of springs 104.

Shaft 102 is connected to a plunger rod 107 which extends downwardly into connection with a traveling block 108. A pair of side bar drive links connect the drive motor in the upper portion of the tool with plunger rod 107 by means of a transverse drive pin 109. Side bar links 110, although not shown in FIG. 5 are illustrated in FIG. 9.

A slide bracket 111 is connected to traveling block 108 and contains a follower window 112 formed therein. A circular roller 113 is located in relatively close fitting relationship in window 112. A drive arm 114 is pinned at 115 to the center of roller 113 and is rotatably pinned to the tool body by pin 116. Drive arm 114 has a lower vertical section 117 extending downward generally parallel to and recessed within body 101. An articulated pad arm 118 is pinned to arm section 117 by a pivotal connection 119 in an opening 120 cut through the center portion of section 117. The lower portion of opening 120 is formed in the tapered abutment surface 121 arranged to abut articulated arm pad 118 and rotated outward against the borehole wall. A contact pad 122 is pivotally connected to arm 118 and lower section 117.

A second follower channel 123 is formed in slide bracket 111 and has at one end (not shown) an angular short section similar to the one disclosed in FIG. 3 at 22b. A follower pin 124 is located in close fitting slidable relationship in channel 123 and has retained thereon a bellcrank arm 125 which is rotatably pinned to the body at 126. The bellcrank arm has a second angular section 127 and a generally vertical lower section 128 upon which is rotatably pinned the logging pad 130 at pin 129.

A third follower channel 131 is formed in bracket 111 and receives a stationary guide pin 132 securedly held in the tool body and projecting inward through channel 131 to maintain guide bracket 11 in proper lateral alignment.

In typical operation, the logging instrument 100 is lowered by wireline into the wellbore until it reaches the area of the underground formation to be logged. The electric motor is actuated which applies a downward movement of link bars 110 to release compression springs 104. This applies a downward force to rod 107 which transfers through bracket 111 to roller 113. This applies a rotational moment to drive arm 114 moving linkage 117 and 118 radially outward from the tool body until pad 122 engages the borehole wall thereby decentralizing the tool body against the opposing borehole wall.

Simultaneously, with the opening of the caliper arm 118 and pad 122, bracket 111 moves downward, forcing pin 124 out of the angular end of channel 123 and applying a rotational force to arm 125 which is transferred via arm sections 127 and 128 to the logging pad 130. The slight rotation of arm 125 about pin 126 moves the density pad 130 outward a preselected distance into engagement with the formation to be logged.

Thus, it can be seen that the embodiments of the present invention provide a very dependable and efficient but not overly complex apparatus for a logging tool which maintains the caliper pad and logging pad inside the tool body until the moment that logging operations are to begin. The apparatus removes the need for complex hydro-mechanical assemblies and provides sufficient radial extension of the logging pad to make optimum contact with the borehole wall and yet maintains a logging pad close enough to the tool to maintain maximum accuracy and minimum deterioration of the logging instrument. Furthermore, the tool combines the caliper function of the widely extendable caliper arm with the logging function of the slightly extendable density pad.

Although a specific preferred embodiment of the present invention has been described in the detailed description above, the description is not intended to limit the invention to the particular forms of embodiments disclosed therein since they are to be recognized as illustrative rather than restrictive and it will be obvious to those skilled in the art that the invention is not so limited. For instance, whereas the present invention is described for use as a density measuring instrument, it is obvious that other type logging tools which are required to be maintained close to the borehole wall could be utilized effectively instead of or in conjunction with the density instrument. For example, one type of instrument used in conjunction with the density logging tool is the compensated neutron well logging system. Thus, the invention is declared to cover all changes and modifications of the specific example of the invention herein disclosed for purposes of illustration which do not constitute departures from the spirit and scope of the invention.

The embodiments of the invention in which an exclusive property or privilege is claimed are defined as follows:

1. In a wellbore logging instrument having a pivotal decentralizing arm and a borewall engaging logging pad connected to an elongated body member, with an actuator motor assembly for pivoting the decentralizing arm inward and outwards from the body, the improvement comprising:

linkage means connecting said decentralizing arm and said logging pad to said motor assembly and having cam means for limiting movement of said logging pad to a relatively small radial distance while allowing relatively great radial extension of said decentralizing arm;

wherein said cam means comprises an actuator plunger connected to said motor assembly, longitudinally slidably mounted in said enlongated body, and having said decentralizing arm and said logging pad movably secured thereto; and, wherein said motor assembly comprises an electric motor operably connected to a drive link assembly arranged to control a compression spring abutting said actuator plunger.

2. A well logging tool for logging close to a borehole wall, said tool comprising:

an elongated tubular body;

a power plunger located slightly longitudinally in said body and adapted to respond slidably to a source of motive power;

an extendable arm assembly pivotally mounted in an elongated vertical opening in said body and having a bellcrank arm extending past said pivotal mounting;

a linkage bar pivotally connected to said plunger and said bellcrank arm and arranged to pivot said extendable arm in response to longitudinal sliding movement of said plunger;

a logging pad located longitudinally in an elongated opening in said body and radially movable therein;

an angular extended bellcrank arm pivotally connected to said logging pad at one end and pivotally connected to said body near the other end;

a lever arm formed on the opposite end of said bellcrank arm from said logging pad and having a cam follower located in the opposite end; and, a cammed slot in said plunger having an extended longitudinal section generally parallel with the longitudinal axis of said body, and a short angular section joining said longitudinal section.

3. A logging instrument for logging close to a borehole wall, said instrument comprising:

an elongated tubular body;

a power plunger located in longitudinal slidable arrangement in said body and arranged to respond slidably to a motive power source;

an extendable arm assembly pivotally mounted to said body, extending inside a longitudinal opening therein, and having a lever arm extending past the pivotal mounting and into the bore of said body;

said plunger having a guide slot, a cam follower slot, and a guide window formed therein;

roller means pivotally connected to said lever arm and engaging in said guide window;

a guide pin secured in said body and slidably engaging in said guide slot;

a logging pad assembly partially located in a longitudinal opening in said body, having a logging pat at one end and a bellcrank arm at the other end pivotally connected to said body;

a lever arm attached to said bellcrank arm past said pivotal mounting and having a cam follower pin secured therein, projecting into said cam follower slot in slidable relationship therein; and, said cam follower slot having a longitudinal elongated section and an angular section.

* * * * *